US010621754B2

(12) United States Patent
Sato

(10) Patent No.: US 10,621,754 B2
(45) Date of Patent: Apr. 14, 2020

(54) METHOD OF DETECTING SKIN COLOR AREA OF HUMAN

(71) Applicant: CASIO COMPUTER CO., LTD., Tokyo (JP)

(72) Inventor: Takeshi Sato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 179 days.

(21) Appl. No.: 15/711,629

(22) Filed: Sep. 21, 2017

(65) Prior Publication Data

US 2018/0089856 A1 Mar. 29, 2018

(30) Foreign Application Priority Data

Sep. 23, 2016 (JP) .................. 2016-186167

(51) Int. Cl.
*G06T 7/90* (2017.01)
*G06F 16/583* (2019.01)
*H04N 1/62* (2006.01)
*H04N 1/64* (2006.01)

(52) U.S. Cl.
CPC ............ *G06T 7/90* (2017.01); *G06F 16/5838* (2019.01); *H04N 1/62* (2013.01); *H04N 1/628* (2013.01); *H04N 1/642* (2013.01); *G06T 2207/10024* (2013.01); *G06T 2207/30088* (2013.01)

(58) Field of Classification Search
None
See application file for complete search history.

(56) References Cited

U.S. PATENT DOCUMENTS

| 6,272,239 B1 * | 8/2001 | Colla ..................... H04N 9/643 348/E9.04 |
| 2009/0263013 A1 * | 10/2009 | Xiong .................. G06K 9/4652 382/164 |
| 2011/0019029 A1 | 1/2011 | Matsumoto et al. |
| 2013/0216154 A1 * | 8/2013 | Li ...................... G06K 9/00281 382/274 |
| 2014/0092407 A1 * | 4/2014 | Sawada ................ H04N 1/6027 358/1.9 |

FOREIGN PATENT DOCUMENTS

| JP | H11-191156 A | 7/1999 |
| JP | 2000261650 A * | 9/2000 |
| JP | 2001331803 A * | 11/2001 |

(Continued)

OTHER PUBLICATIONS

JPO; Application No. 2016-186167; Notification of Reasons for Refusal dated Jul. 10, 2018.

*Primary Examiner* — Iman K Kholdebarin
(74) *Attorney, Agent, or Firm* — Fitch, Even, Tabin & Flannery LLP

(57) ABSTRACT

An image capture apparatus includes a skin map generation processing unit and an image composition unit. The skin map generation processing unit detects a skin color area in an image. The skin map generation processing unit detects a saturated area of high value and low saturation in the image. The image composition unit executes processing of correcting the skin color area detected by the skin map generation processing unit by using the saturated area detected by the skin map generation processing unit.

11 Claims, 9 Drawing Sheets

(56) References Cited

FOREIGN PATENT DOCUMENTS

| | | |
|---|---|---|
| JP | 2004-246424 A | 9/2004 |
| JP | 2007-257087 A | 10/2007 |
| JP | 2011-44132 A | 3/2011 |
| JP | 5355308 B2 | 9/2013 |
| JP | 2016-051302 A | 4/2016 |

* cited by examiner

FIG.2
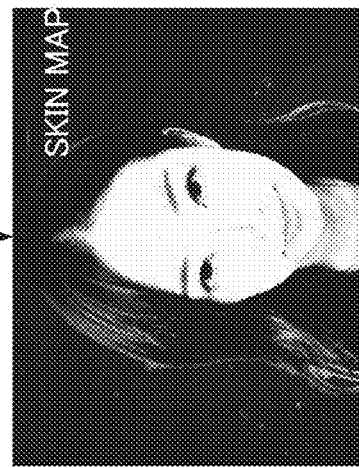
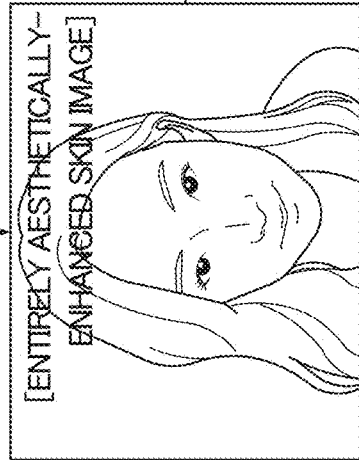
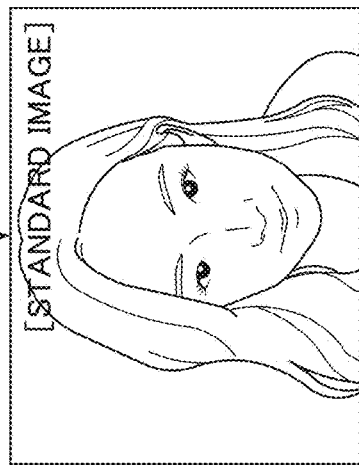

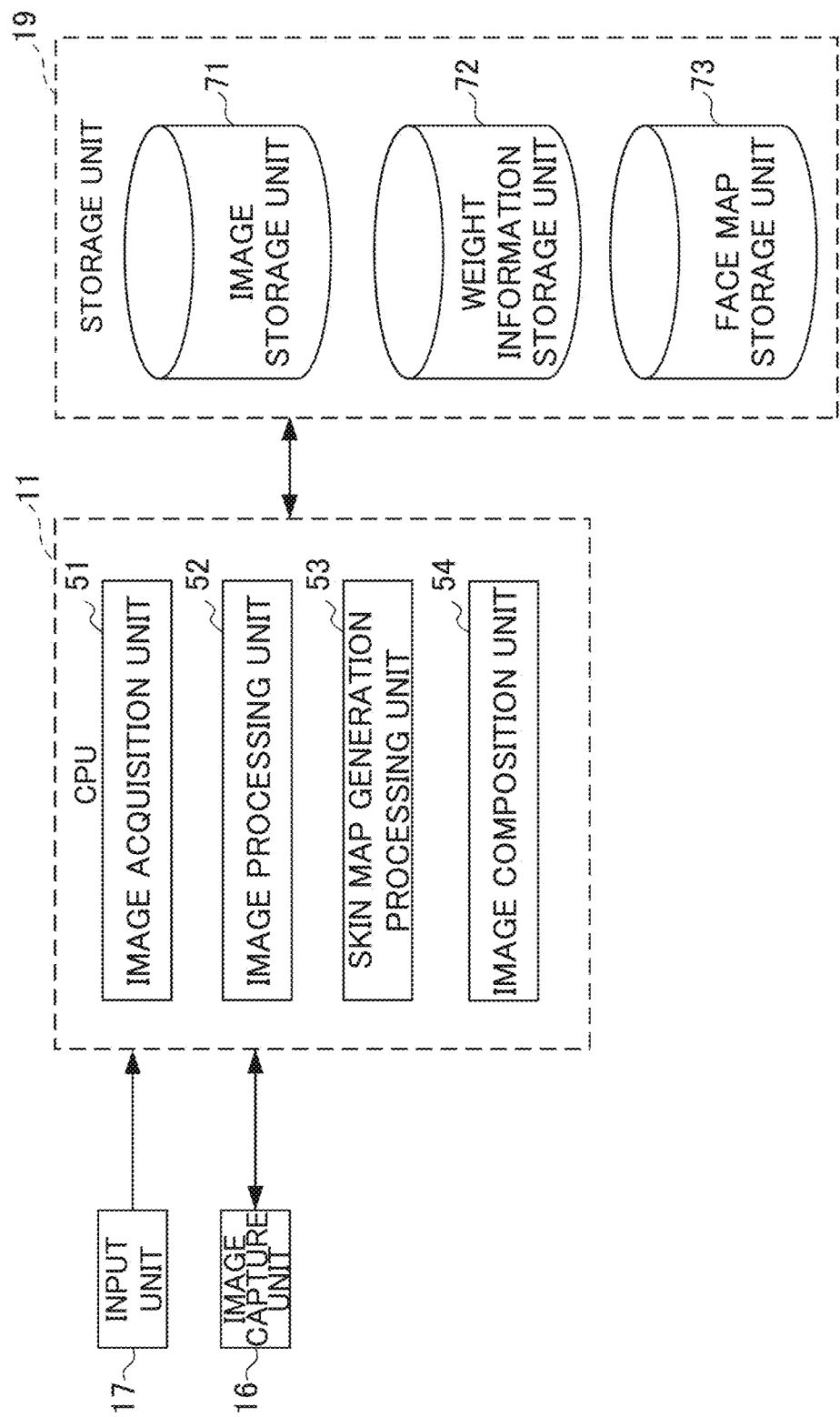

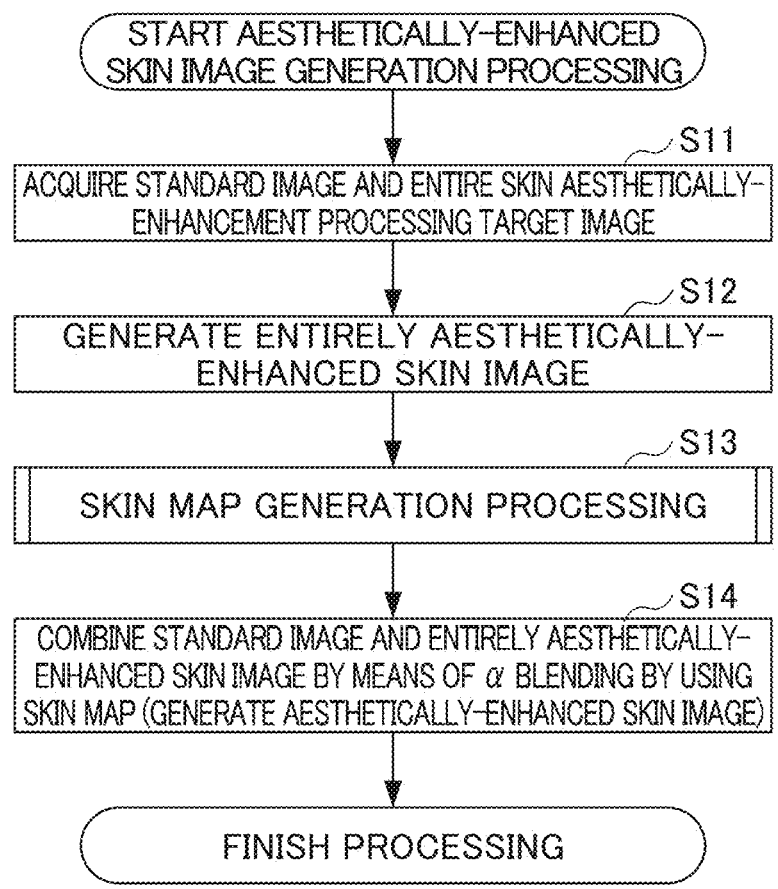

METHOD OF DETECTING SKIN COLOR AREA OF HUMAN

CROSS-REFERENCE TO RELATED APPLICATION

This application is based on and claims the benefit of priority from Japanese Patent Application No. 2016-186167, filed on 23 Sep. 2016, the content of which is incorporated herein by reference.

BACKGROUND OF THE INVENTION

Field of the Invention

The present invention relates to a detection method.

Related Art

A conventional technique of detecting a skin color area in a human face in an image by using information about color in HSV color space is disclosed in Japanese Patent Application Publication No. 2011-44132, for example.

SUMMARY OF THE INVENTION

The detection method according to one aspect of the present invention is comprised: skin color area detection processing of detecting a skin color area in an image; a saturated area detection processing of detecting a saturated area of high value and low saturation in the image; and skin color area correction processing of executing processing of correcting the skin color area detected by the skin color area detection processing by using the saturated area detected by the saturated area detection processing. A detection method according to one aspect of the present invention is comprised: skin color level calculation processing of calculating a skin color level indicating a skin color likelihood for each of multiple portions in an image; a saturated level calculation processing of calculating a saturated level indicating a degree of saturation meaning high value and low saturation for each of the multiple portions in the image; and skin color area detection processing of detecting a skin color area in the image by using the skin color level calculated by the skin color level calculation processing and the saturated level calculated by the saturated level calculation processing. A detection method according to one aspect of the present invention is comprised: skin color level calculation processing of calculating a skin color level indicating a skin color likelihood for each of multiple portions in an image based on information about color containing a hue component, in HSV color space; adjustment processing of adjusting a weight for the hue component used for calculation of the skin color level by the skin color level calculation processing based on a distribution of a hue component for each of the multiple portions in the image; and skin color area detection processing of detecting a skin color area in the image based on the skin color level calculated by the skin color level calculation processing, wherein the skin color level calculated by using the weight adjusted. A detection method according to one aspect of the present invention is comprised: a skin color determination processing of determining a situation of a skin color in an image; a saturated situation determination processing of determining a saturated situation of high value and low saturation in the image; and a skin color area detection processing of detecting a skin color area in the image based on the situation of the skin color determined by the skin color determination processing and the saturated situation determined by the saturated situation determination processing. The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

This application will be understood more deeply by considering the detailed description given below and the drawings explained below.

FIG. 2 is a schematic view for explaining generation of an aesthetically-enhanced skin image;

FIG. 7 is a functional block diagram showing a functional configuration belonging to the functional configuration of the image capture apparatus 1 in FIG. 1 and responsible for execution of aesthetically-enhanced skin image generation processing;

FIG. 8 is a flowchart for explaining a flow of the aesthetically-enhanced skin image generation processing executed by the image capture apparatus 1 in FIG. 1 having the functional configuration in FIG. 7.

DETAILED DESCRIPTION OF THE INVENTION

An embodiment of the present invention will be described below by using the drawings.

Figure 1:
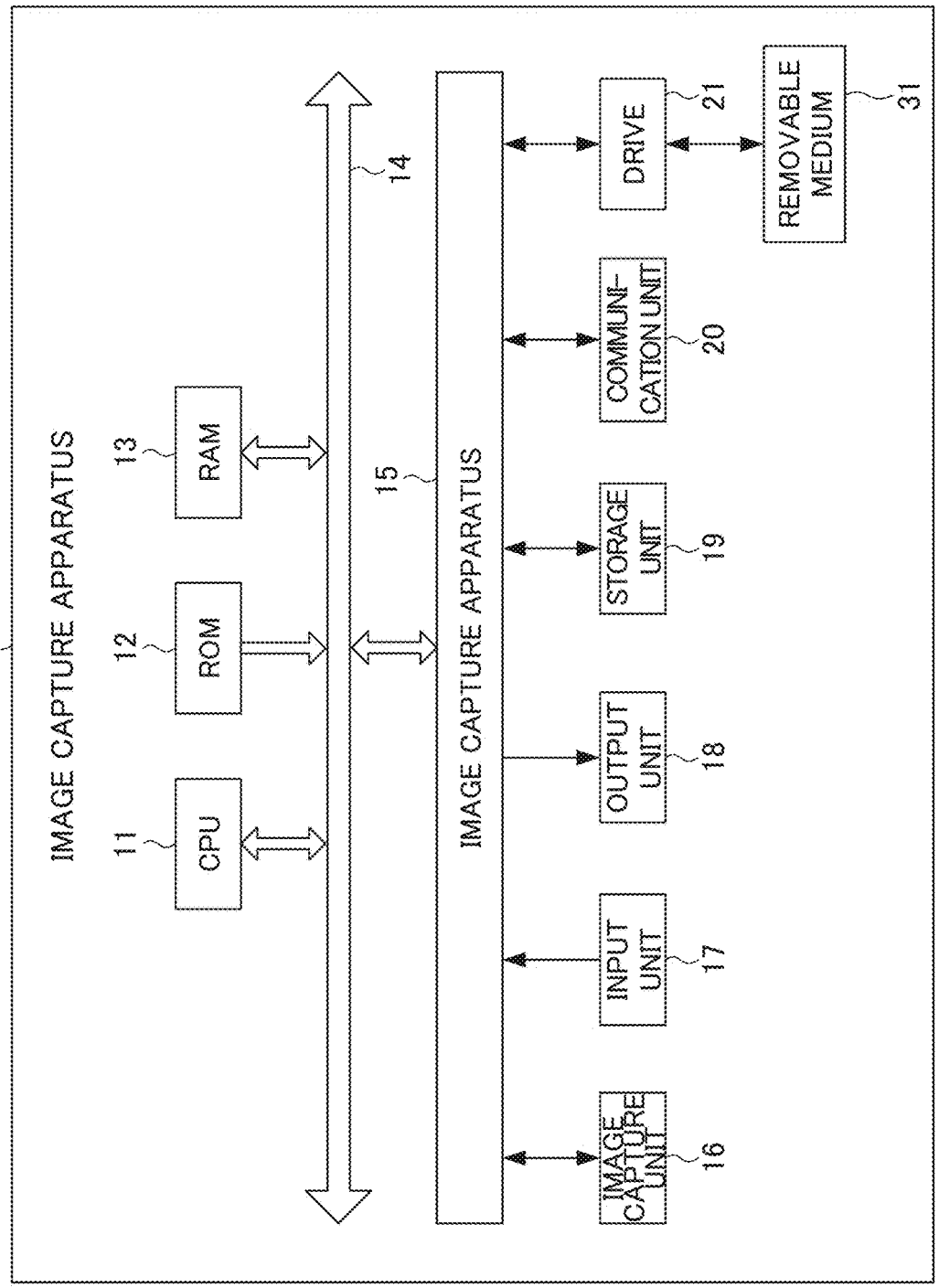
FIG. 1 is a block diagram showing the hardware configuration of an image capture apparatus 1 as an embodiment of a detection apparatus according to the present invention.

FIG. 1 is a block diagram showing the hardware configuration of an image capture apparatus 1 as an embodiment of a detection apparatus according to the present invention. The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE. The AFE executes a variety of signal processing such as A/D (Analog/Digital) conversion processing of the analog signal. The variety of signal processing generates a digital signal in YUV color space that is output as an output signal from the image capture unit 16. Such an output signal of the image capture unit 16 is hereinafter referred to as "data of a captured image". Data of a captured image is supplied to the CPU 11, an image processing unit (not illustrated), and the like as appropriate.

The input unit 17 is configured by various buttons and the like, and inputs a variety of information in accordance with instruction operations by the user. The output unit 18 is configured by the display unit, a speaker, and the like, and outputs images and sound. The storage unit 19 is configured by DRAM (Dynamic Random Access Memory) or the like, and stores data of various images. The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

The image capture apparatus 1 with the above-described configuration has a function that allows detection of a skin color area of a human appropriately and generation of an image in which only the skin color area is subjected to skin aesthetically-enhancement processing (hereinafter called an aesthetically-enhanced skin image), even if a skin color is unfortunately saturated by high brightness or even under light environments such as an environment where a deep shadow is caused and an environment where multiple light sources of different color temperatures are mixed, for example.

[Generation of Aesthetically-Enhanced Skin Image]

Generation of an aesthetically-enhanced skin image will be described below. FIG. 2 is a schematic view for explaining generation of the aesthetically-enhanced skin image.

As shown in FIG. 2, for generation of the aesthetically-enhanced skin image, a background image (hereinafter called a "standard image") and an image to be a target of the skin aesthetically-enhancement processing (hereinafter called an "entire skin aesthetically-enhancement processing target image") are acquired first from data about a captured image. The "standard image" and the "entire skin aesthetically-enhancement processing target image" at this stage are in YUV color space. Then, the skin aesthetically-enhancement processing is executed on the entire skin aesthetically-enhancement processing target image in its entirety to generate an entirely aesthetically-enhanced skin image. Further, a map is generated by extracting a skin color area from a face in the entirely aesthetically-enhanced skin image (this generated map will be called a "skin map").

Then, the standard image and the entirely aesthetically-enhanced skin image are combined by means of a blending by using the generated skin map. An image generated by combining the standard image and the entirely aesthetically-enhanced skin image by means of a blending is an image in which the skin aesthetically-enhancement processing is executed only on the skin color area in the face (this generated image will be called an "aesthetically-enhanced skin image").

[Generation of Skin Map]

Figure 3A:
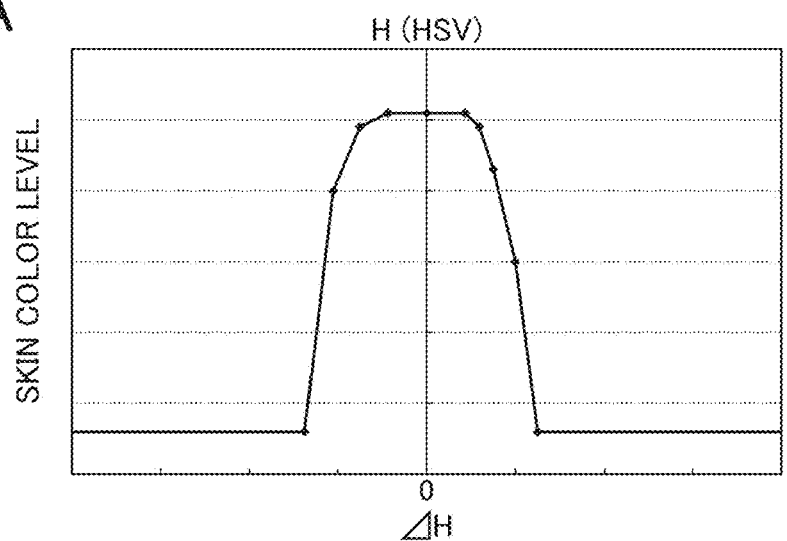
FIG. 3A is a schematic view for explaining generation of a skin map.
Figure 3B:
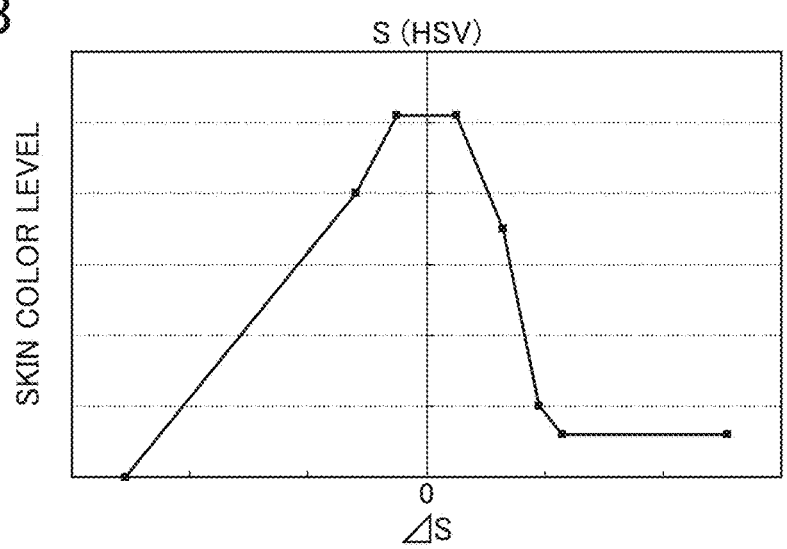
FIG. 3B is a schematic view for explaining generation of the skin map.
Figure 3C:
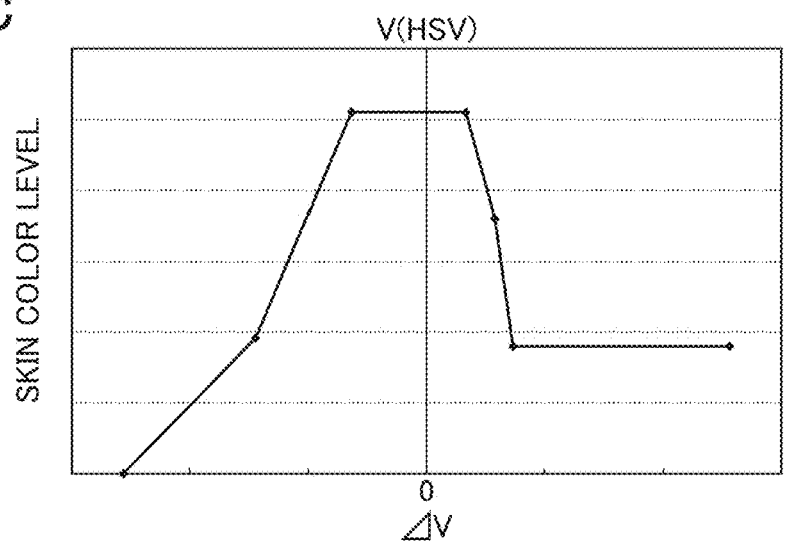
FIG. 3C is a schematic view for explaining generation of the skin map.

Generation of the skin map will be described. FIGS. 3A to 3C are schematic views for explaining generation of the skin map.

First, for generation of the skin map, the entirely aesthetically-enhanced skin image in YUV color space is converted to HSV (hue, saturation (or chroma), and value (or lightness or brightness)) color space. Then, H, S, and V are measured from the HSV-converted image to calculate an average of an H channel, that of an S channel, and that of a V channel. Next, as shown in FIGS. 3A to 3C, skin color levels (Lh, Ls, and Lv), respectively indicating skin color likelihoods of the H, S, and V channels, are calculated in terms of each of H, S, and V in each pixel in response to differences from the corresponding averages and by using corresponding predetermined weights. Then, the respective calculated skin color levels of the H, S, and V channels are multiplied to calculate a skin map value in a pixel. In this way, the skin map containing the skin map value is generated. In the skin map, a portion of a high skin color likelihood and a portion of a low skin color likelihood are displayed in stages. As shown in FIG. 2, in the skin map according to this embodiment, a portion in white is displayed as a portion of the highest skin color likelihood, and a portion in black is displayed as a portion of the lowest skin color likelihood.

[Adaptation to Influence Caused Under Various Light Environments]

For generation of the skin map, if light is applied uniformly to a face, a skin color area can be extracted accurately. By contrast, under various light environments such as an environment where a deep shadow is caused and an environment where multiple light sources of different color temperatures are mixed, for example, a skin color area cannot be extracted appropriately. Failing to extract a skin color area appropriately excludes an area not having been extracted as a skin color area from a target of the skin aesthetically-enhancement processing. Hence, this area unfortunately remains as noise in a final image.

Figure 4A:
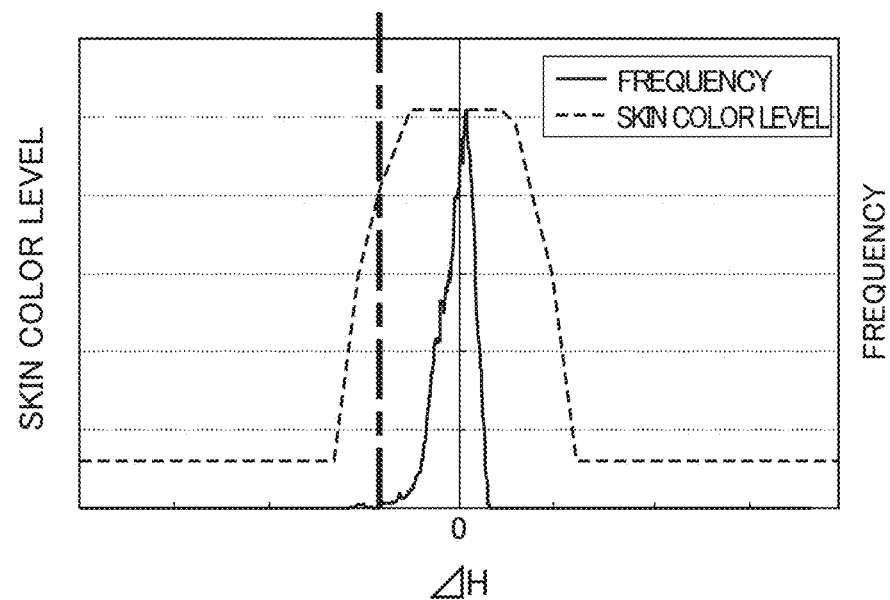
FIG. 4A is a schematic view for explaining influence caused under various light environments.
Figure 4B:
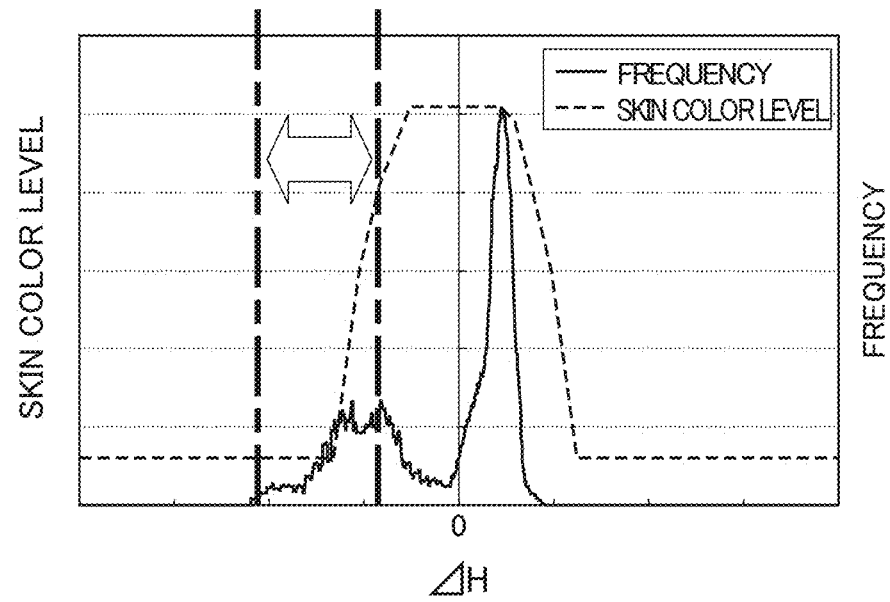
FIG. 4B is a schematic view for explaining influence caused under various light environments.

This embodiment adapts to various light environments by the following methods. FIGS. 4A and 4B are schematic view for explaining influence caused under various light environments. The influence described herein is on the hue (H). Skin color levels shown in FIGS. 4A and 4B correspond to the skin color level shown in FIG. 3A. As shown in FIG. 4A, in an image captured in a normal scene, a frequency distribution of the hue (H) falls within a preset value of a weight (falls within a calculated skin color level). In this case, this image can be extracted appropriately as a skin color area. Alternate long and short dashed lines show a value at which a frequency is substantially zero in a negative direction with respect to an average. By contrast, as shown in FIG. 4B, in an image captured in a scene where multiple light sources of different color temperatures are mixed, for example, several frequency peaks are observed. Further, even in an actual skin color area, a frequency distribution of the hue (H) (in particular, a frequency distribution in a range defined by an arrow proceeding further in the negative direction with respect to the alternate long and short dashed lines shown in FIG. 4A) does not fall within a preset value of a weight (does not fall within a calculated skin color level). In this case, this image is excluded from a skin color area.

According to this embodiment, a histogram of a measurement result about the hue (H) is generated. By using a result of analysis of the histogram, a weighting factor for the hue (H) is determined again. By analyzing the histogram and employing a weight responsive to an image, a skin color area can be extracted appropriately even under various light environments.

Figure 5A:
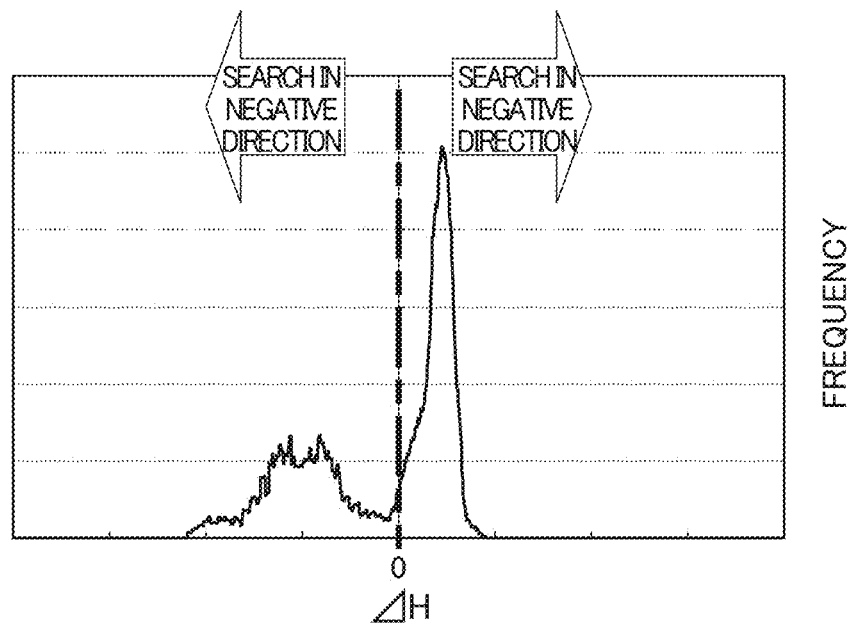
FIG. 5A is a schematic view for explaining redetermination of a weight for a hue (H)
Figure 5B:
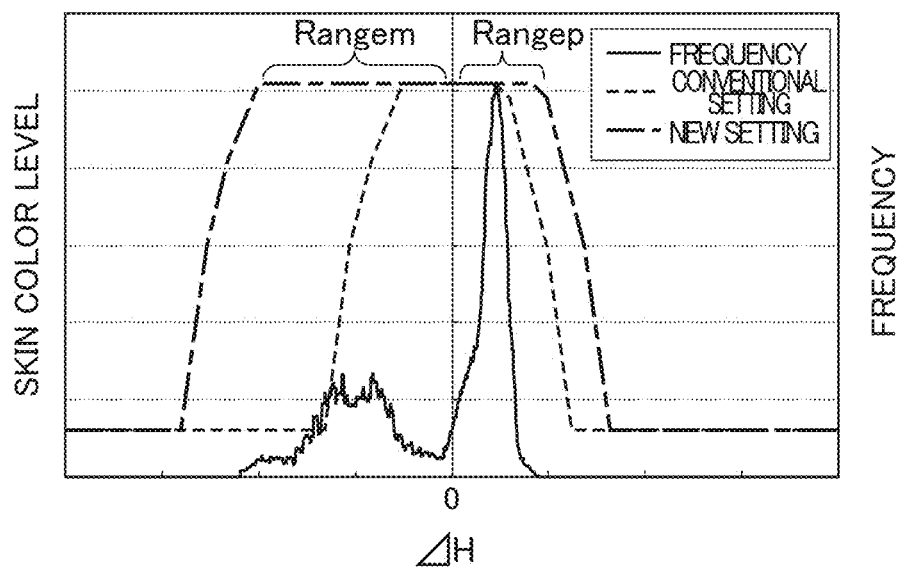
FIG. 5B is a schematic view for explaining redetermination of the weight for the hue (H)

FIGS. 5A and 5B are schematic views for explaining redetermination of a weight for the hue (H). First, an average of the hue (H) measured in a measuring area in a human face (in this embodiment, an area near a human nose) is calculated. Then, a histogram such as that shown in FIG. 5A is generated in response to a difference from the average. The generated histogram is analyzed by searching the histogram for values (Rangep and Rangem) not exceeding a threshold in a positive direction and a negative direction. In response to the values Rangep and Rangem searched for as a result of the histogram analysis, a predetermined weight is adjusted and a weight is determined again. Specifically, as shown in FIG. 5B, in response to the values Rangep and Rangem, the predetermined weight (according to conventional setting) is adjusted by extending the range of the predetermined weight to the range of the newly determined weight (according to new setting). A skin color area of the hue (H) is extracted based on the newly determined weight. By doing so, an appropriate skin color area can be extracted even from images captured under various light environments. Specifically, in a method of calculating a skin color level by using information about color in HSV color space and detecting a skin color area, a weight for a hue component having conventionally been fixed is adjusted in response to a distribution of the hue component. Then, a skin color level is calculated. As a result, even under various light environments such as an environment where the hue component distributes widely, an environment where a deep shadow is caused, and an environment where light beams from multiple light sources of different color temperatures are applied, a skin color area can still be extracted and handled appropriately.

[Adaptation to Skin Saturated Area]

According to the above-described method of extracting a skin color area, a skin color is determined in terms of each of the H, S, and V channels. This causes a problem in that, if the hue (H) is rotated inadvertently to cause an area unfortunately excluded from the hue (H) of a skin color (this area will be called a "saturated area"), extracting this area as a skin color area becomes impossible. The saturated area, which is inherently a skin color area but not having been extracted as a skin color area due to be saturated, is excluded from a target of the skin aesthetically-enhancement processing. Hence, the saturated area unfortunately remains as noise in a final image.

Figure 6A:
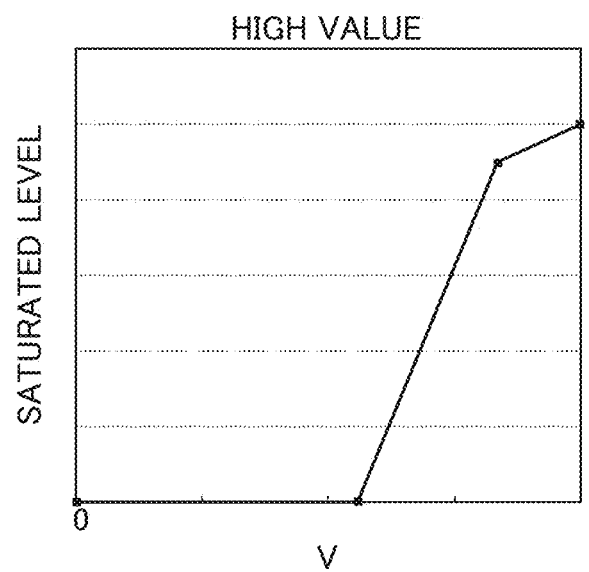
FIG. 6A is a schematic view for explaining determination about a skin color saturated area.
Figure 6B:
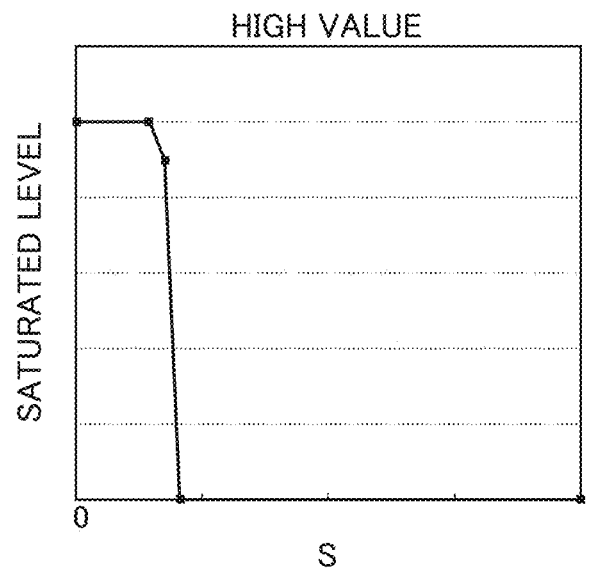
FIG. 6B is a schematic view for explaining determination about the skin color saturated area.

According to this embodiment, for extraction of a skin color area, a skin color saturated area is determined. FIGS. 6A and 6B are schematic views for explaining determination about a skin color saturated area. As shown in FIGS. 6A and 6B, it is determined whether or not the skin color saturated area falls within a preset value of a predetermined weight in a high value area and a low saturation area. Saturated levels are calculated based on weights of the value (V) and the saturation (S) in each pixel. Then, the respective calculated saturated levels of the value (V) and the saturation (S) are multiplied. Further, each of these saturated levels is compared to a corresponding calculated skin color level. By employing a level determined to have a larger value as a skin map value, a skin map of the saturated area is generated. Specifically, saturated levels calculated from a value component and a saturation component except a hue component are used to complement a portion in a saturated skin color that has not been detected by a conventional skin color area detection method of using the hue component in HSV color space.

FIG. 7 is a functional block diagram showing a functional configuration belonging to the functional configuration of the image capture apparatus 1 in FIG. 1 and responsible for execution of aesthetically-enhanced skin image generation processing.

The aesthetically-enhanced skin image generation processing is a processing sequence of generating an aesthetically-enhanced skin image in which only a skin color area in a face is subjected to the skin aesthetically-enhancement processing from data about a captured image. The aesthetically-enhanced skin image generation processing includes skin map generation processing. The skin map generation processing is a processing sequence of generating a skin map used for identifying a skin color area. In the skin map, indexes showing skin color likelihoods are displayed in stages. The skin map generated by the skin map generation processing covers an area in which a skin color is unfortunately saturated in terms of the hue (H) or areas unfortunately excluded from a skin color area under various light environments.

As shown in FIG. 7, for execution of the aesthetically-enhanced skin image generation processing, the following units become functional in the CPU 11: an image acquisition unit 51, an image processing unit 52, a skin map generation processing unit 53, and an image composition unit 54.

An image storage unit 71, a weight information storage unit 72, and a face map storage unit 73 are defined in a partial region of the storage unit 19.

The image storage unit 71 stores data about an image captured by the image capture unit 16 and data about an image such as an aesthetically-enhanced skin image in which only a skin of a human face is subjected to the skin aesthetically-enhancement processing, for example.

The weight information storage unit 72 stores information about weighting factors for H, S, and V used for calculating skin color levels, and information about a weighting factor for an area of high value (V) and information about an area of low saturation (S) used for calculating saturated levels.

The face map storage unit 73 stores a face map that is a mask image used for determining only a face area as a target of a blending. This mask image has an oval shape substantially corresponding to a normal shape of a face.

The image acquisition unit 51 acquires a processing target image. More specifically, the image acquisition unit 51 acquires a standard image and an entire skin aesthetically-enhancement processing target image for a face from data about a captured image output from the image capture unit 16, for example. The standard image is an image to be used during a blending as a background area other than a skin color area. However, the image acquisition unit 51 may acquire these images not only from the data from the image capture unit 16 but may also acquire these images from data about an image stored in the image storage unit 71. Alternatively, data about an image stored in an external apparatus may be acquired through the communication unit 20.

The image processing unit 52 executes image processing on the image. More specifically, the image processing unit 52 executes the aesthetically-enhancement processing on an entire skin aesthetically-enhancement processing target image in its entirety, for example, thereby generating an entirely aesthetically-enhanced skin image. The skin aesthetically-enhancement processing is to aesthetically enhance various types of human skins by means of smoothing using a noise reduction (NR) filter, for example. Various publicly-known skin aesthetically-enhancing techniques are applicable.

The skin map generation processing unit 53 executes the skin map generation processing. As a result of execution of the skin map generation processing, a skin map is generated in which skin color likelihoods in a skin color area in a face area are identified in stages.

The skin map generation processing unit 53 extracts a skin color area in stages based on the skin of a face in the image. Regarding an area that cannot be extracted as a skin color area as a result of saturation of a skin color due to high brightness, the skin map generation processing unit 53 allows this saturated area to be extracted and placed in the skin map by calculating a saturated level in a high brightness area and saturated level in a low saturation area. Further, to adapt to various light environments such as an environment where a deep shadow is caused and an environment where light beams from multiple light sources of different color temperatures are applied, for example, the skin map generation processing unit 53 adjusts a weight for the hue (H) to a range responsive to the image to allow calculation of a skin color level. This allows extraction of an area in a saturated skin color that cannot be extracted by a general method and extraction of a skin color area under various light environments that cannot be extracted by a general method, in addition to extraction of a skin color area based on the skin of a human face. As a result, in a resultant aesthetically-enhanced skin image, only a skin area in a human face can be subjected to the skin aesthetically-enhancement processing appropriately.

The image composition unit 54 combines images. More specifically, the image composition unit 54 combines a standard image and an entirely aesthetically-enhanced skin image subjected entirely to the skin aesthetically-enhancement processing by means of a blending by using a mask image including a skin map as an α value, for example.

FIG. 8 is a flowchart for explaining a flow of the aesthetically-enhanced skin image generation processing executed by the image capture apparatus 1 in FIG. 1 having the functional configuration in FIG. 7. The aesthetically-enhanced skin image generation processing starts in response to user' operation on the input unit 17 for starting the aesthetically-enhanced skin image generation processing.

In step S11, the image acquisition unit 51 acquires two images, a standard image and an entire skin aesthetically-enhancement processing target image, from data about a captured image output from the image capture unit 16.

In step S12, the image processing unit 52 executes the skin aesthetically-enhancement processing on the entire skin aesthetically-enhancement processing target image in its entirety to generate an entirely aesthetically-enhanced skin image.

In step S13, the skin map generation processing unit 53 executes the skin map generation processing. As a result of the skin map generation processing, a skin map used for a blending is generated. The skin map generation processing will be described in detail later.

In step S14, the image composition unit 54 combines the standard image and the entirely aesthetically-enhanced skin image by means of a blending by using the skin map. As a result of the α blending, an aesthetically-enhanced skin image is generated in which only the skin of a human face is subjected to the skin aesthetically-enhancement processing (see FIG. 2). The generated aesthetically-enhanced skin image is stored into the image storage unit 71. Then, the aesthetically-enhanced skin image generation processing is finished.

Figure 9:
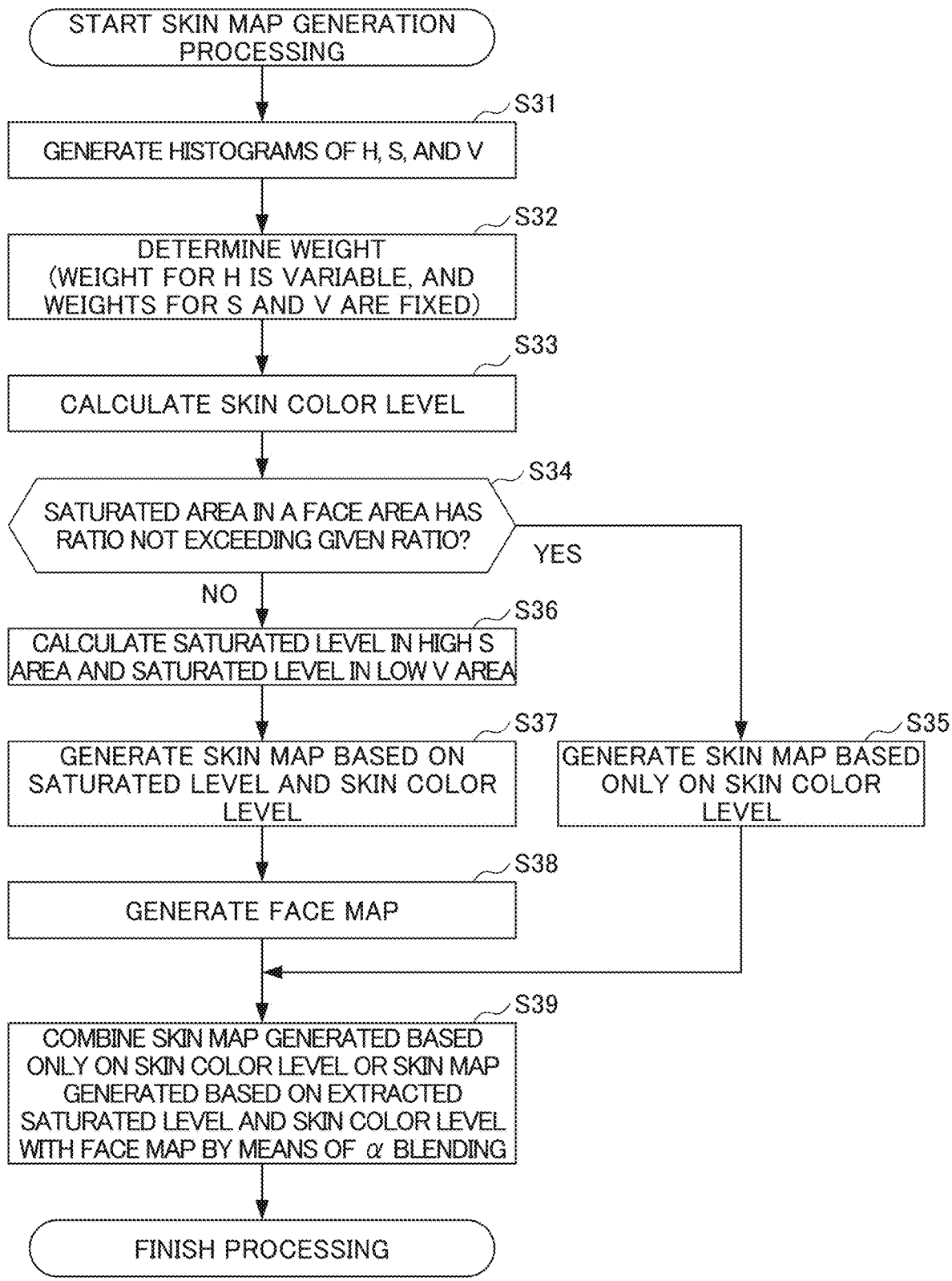
FIG. 9 is a flowchart for explaining a flow of skin map generation processing as part of the aesthetically-enhanced skin image generation processing.

FIG. 9 is a flowchart for explaining a flow of the skin map generation processing as part of the aesthetically-enhanced skin image generation processing.

In step S31, the skin map generation processing unit 53 converts the entirely aesthetically-enhanced skin image in YUV color space to HSV, and generates respective histograms of the H, S, and V channels in response to differences from corresponding measured averages of H, V, and S.

In step S32, the skin map generation processing unit 53 determines weights for the histograms of H, S, and V. Regarding the S and V channels, weights for S and V stored in the weight information storage unit 72 are determined as respective weights for the histograms of S and V (see FIGS. 3B and 3C). Regarding the H channel, the histogram of H is analyzed and the range of a weight for H stored in the weight information storage unit 72 is extended to an area covering H, thereby determining a weight for H again. The histogram of H is analyzed by searching this histogram for values not exceeding a threshold in a positive direction and a negative direction with respect to an average of H as a starting point (see FIG. 5A). As a result of the search, the range of the weight is extended to locations of the values not exceeding the threshold (see FIG. 5B).

In step S33, the skin map generation processing unit 53 calculates the skin color levels Lh, Ls, and Lv in each pixel by using the determined weights for S and V and the weight for H determined again.

In step S34, the skin map generation processing unit 53 determines whether or not a saturated area in a face area has a ratio not exceeding a given ratio. By making this determination, an image with a narrow saturated area of a ratio that does not cause any influence is exempted from processing to be executed in consideration of a saturated area. Thus, processing burden is reduced. If the ratio of the saturated area exceeds the given ratio, a determination made in step S34 is NO and then the processing shifts to step S36. If the ratio of the saturated area does not exceed the given ratio, a determination made in step S34 is YES and then the processing shifts to step S35.

In step S35, the skin map generation processing unit 53 generates a skin map by calculating a skin map value for each pixel based only on the calculated skin color levels. The skin map value is calculated based on the following formula (1):

$$\text{Skin map value (MAP)} = Lh \times Ls \times Lv \quad (1)$$

In this formula, "Lh" is the skin color level of the hue (H), "Ls" is the skin color level of the saturation (S), and "Lv" is the skin color level of the value (V). Then, the skin map generation processing is finished.

In step S36, for the reason that the ratio of the saturated area exceeds the given ratio, the skin map generation processing unit 53 generates a histogram of a high value area and a histogram of a low saturation area. By using a weight for the high value area and a weight for the low saturation area stored in the weight information storage unit 72, the skin map generation processing unit 53 calculates a saturated level in the high value area and a saturated level in the low saturation area (see FIGS. 6A and 6B).

In step S37, the skin map generation processing unit 53 calculates a skin map value for each pixel based on the formula (1) and calculates a saturation map value based on the following formula (2). Then, the skin map generation processing unit 53 compares the skin map value and the saturation map value both calculated for each pixel, and employs either the skin map value or the saturation map value having a larger value as a final skin map value (obtains the logical sum of the skin map value and the saturation map value), thereby generating a skin map. The saturation map value is calculated based on the following formula (2):

$$\text{Saturation map value (MAP)} = \text{high } Lv \times \text{low } Ls \quad (2)$$

In this formula, "high Lv" is the skin color level in the high value area, and "low Ls" is the skin color level in the low saturation area. As a result, the generated skin map contains a saturated area that is inherently a skin color area or contains areas not having been extracted as a skin color area under various light environments.

In step S38, the skin map generation processing unit 53 generates a face map by adjusting a face map stored in the face map storage unit 73 in such a manner that the position and the size of a face in the stored face map conform to those of a face in a corresponding image.

In step S39, the skin map generation processing unit 53 combines the skin map generated in step S35 or S37 and the face map by means of a blending. As a result, the generated skin map does not contain an area having been detected as a skin color area despite the fact that this area is inherently not about a face. Then, the skin map generation processing is finished.

The image capture apparatus 1 of the above-described configuration includes the skin map generation processing unit 53 and the image composition unit 54. The skin map generation processing unit 53 detects a skin color area in an image. The skin map generation processing unit 53 detects a saturated area of high value and low saturation in the image. The image composition unit 54 executes processing of correcting the skin color area detected by the skin map generation processing unit 53 by using the saturated area detected by the skin map generation processing unit 53. Thus, the image capture apparatus 1 is allowed to detect a skin color area appropriately including a portion in a saturated skin color hard to detect by the use of a hue component. As a result, a skin color area of a human can be detected appropriately independently of a light beam situation.

The skin map generation processing unit 53 detects the skin color area based on information about color in HSV color space containing a hue component. The skin map generation processing unit 53 detects the saturated area based on information about color in HSV color space except the hue component. The use of HSV color space allows the image capture apparatus 1 to detect both a skin color area and a saturated area.

The skin map generation processing unit 53 calculates a skin color level indicating a skin color likelihood for each pixel constituting the image based on the information about color in HSV color space containing the hue component. The skin map generation processing unit 53 calculates a saturated level indicating a degree of saturation meaning high value and low saturation for each pixel constituting the image based on the information about color in HSV color space except the hue component. The skin map generation processing unit 53 detects an area in which the calculated skin color level is a given threshold or more as the skin color area. The skin map generation processing unit 53 detects an area in which the calculated saturated level is a given threshold or more as the saturated area. Thus, the image capture apparatus 1 is allowed to detect a skin color area by using the hue component suitable for detection of the skin color area under a normal light beam situation. The image capture apparatus 1 is further allowed to simply detect a skin color area appropriately including a portion in a saturated skin color hard to detect by the use of the hue component.

The image composition unit 54 executes processing of correcting a partial skin color area omitted from the detection by the skin map generation processing unit 53 by using the saturated area detected by the skin map generation processing unit 53. Thus, the image capture apparatus 1 is allowed to correct the partial skin color area omitted from the detection.

The image composition unit 54 executes the processing of correcting the skin color area on an area determined by obtaining the logical sum of the detected skin color area and the detected saturated area. Thus, the image capture apparatus 1 is allowed to identify an area to be corrected through the simple processing.

The skin map generation processing unit 53 executes processing of making correction so as to make the corrected skin color area usable as a skin color area in a human face by further using information about a face area of a human prepared in advance as a basis. Thus, the image capture apparatus 1 is allowed to exclude an area other than a skin color area in a human face that is hard to exclude only by the use of color information by executing the low-burden and simple processing of making correction to a skin color area in a human face.

The image capture apparatus 1 further includes the image processing unit 52 that executes the skin aesthetically-enhancement processing on the skin color area corrected by the image composition unit 54. Thus, the image capture apparatus 1 is allowed to generate an image subjected to the skin aesthetically-enhancement processing for enhancing a human skin aesthetically.

The skin map generation processing unit 53 calculates a skin color level indicating a skin color likelihood for each pixel constituting an image. The skin map generation processing unit 53 calculates a saturated level indicating a degree of saturation meaning high value and low saturation for each pixel constituting the image. The skin map generation processing unit 53 detects a skin color area in the image by using the calculated skin color level and the calculated saturated level. Thus, the image capture apparatus 1 is allowed not only to detect a skin color portion under a normal light beam situation but also to detect a skin color area appropriately including a portion in a saturated skin color. As a result, a skin color area of a human can be detected appropriately independently of a light beam situation.

The skin map generation processing unit 53 calculates the skin color level for each pixel constituting the image based on information about a color component in HSV color space containing a hue component. The skin map generation processing unit 53 calculates the saturated level for each pixel constituting the image based on information about a color component in HSV color space except the hue component. Thus, the image capture apparatus 1 is allowed to detect a skin color area by using the hue component suitable for detection of the skin color area under a normal light beam situation. The image capture apparatus 1 is further allowed to simply detect a skin color area appropriately including a portion in a saturated skin color hard to detect by the use of the hue component.

The skin map generation processing unit 53 detects an area in which at least one of the calculated skin color level and the calculated saturated level is a given threshold or more as a skin color area. Thus, the image capture apparatus 1 is allowed to detect a skin color area appropriately including a hard-to-detect portion in a saturated skin color through the simple processing.

The skin map generation processing unit 53 executes processing of detecting a skin color area in a human face in the image by further using information about a face area of a human prepared in advance as a basis. Thus, the image capture apparatus 1 is allowed to exclude an area other than a skin color area in a human face that is hard to exclude only by the use of color information by executing the low-burden and simple processing of making correction to a skin color area in a human face.

The skin map generation processing unit 53 adjusts a weight for the hue component used for calculation of the skin color level by the skin map generation processing unit 53 based on a distribution of a hue component for each pixel constituting the image. The skin map generation processing unit 53 calculates the skin color level for each pixel constituting the image by using the adjusted weight for the hue component based on information about a color component in HSV color space containing the hue component. As described above, in the image capture apparatus 1, the skin map generation processing unit 53 adjusts the weight for the hue component used for calculation of the skin color level by the skin map generation processing unit 53 based on a distribution of the hue component suitable for detection of a skin color area under a normal light beam situation. Thus, a skin color area of a human can be detected appropriately independently of a light beam situation.

The image capture apparatus 1 further includes the image processing unit 52 that executes the skin aesthetically-enhancement processing on the detected skin color area. Thus, the image capture apparatus 1 is allowed to generate an image subjected to the skin aesthetically-enhancement processing for enhancing a human skin aesthetically.

The skin map generation processing unit 53 determines a situation of a skin color in an image. The skin map generation processing unit 53 determines a saturated situation of high value and low saturation in the image. The skin map generation processing unit 53 detects a skin color area in the image based on the determined situation of the skin color and the determined saturated situation. Thus, the image capture apparatus 1 is allowed to detect a skin color area appropriately even under different color temperatures or on the occurrence of mixture of multiple light sources of different color temperatures, for example. As a result, a skin color area of a human can be detected appropriately independently of a light beam situation.

The skin map generation processing unit 53 calculates a skin color level indicating a skin color likelihood for each pixel constituting an image based on information about color in HSV color space containing a hue component. The skin map generation processing unit 53 adjusts a weight for the hue component used for calculation of the skin color level by the skin map generation processing unit 53 based on a distribution of a hue component for each pixel constituting the image. The skin map generation processing unit 53 detects a skin color area in the image based on the skin color level calculated with the adjusted weight. As described above, in the image capture apparatus 1, the skin map generation processing unit 53 adjusts a weight for the hue component used for calculation of the skin color level based on a distribution of the hue component. Thus, a skin color area of a human can be detected appropriately independently of a light beam situation.

The image capture apparatus 1 further includes the image processing unit 52 that executes the skin aesthetically-enhancement processing on the detected skin color area. Thus, the image capture apparatus 1 is allowed to generate an image subjected to the skin aesthetically-enhancement processing for enhancing a human skin aesthetically.

It should be noted that the present invention is not to be limited to the above-described embodiment but modifications, improvements, etc. within a scope that can achieve the object of the present invention are included in the present invention.

According to the above-described embodiment, the following types of processing are executed together: processing for allowing extraction even of a saturated area as a skin color area; and processing for allowing extraction of a skin color area under various light environments such as an environment where a deep shadow is caused and an environment where light beams from multiple light sources of different color temperatures are applied, for example. Alternatively, these types of processing may be executed separately, or only one of these types of processing may be executed.

According to the above-described embodiment, a pixel constituting an image used for generation of a histogram may be pixels of a number corresponding to an image size for recording, or may be pixels thinned for display of a live view.

According to the above-described embodiment, the range of a weight is extended from a predetermined range of the weight in response to a histogram of the hue (H). Alternatively, the range of the weight may be narrowed. The range of the weight may be narrowed in consideration of influence on an area other than a face area, if the face area in an image is small so executing aesthetically enhancement does not have great importance, for example. Additionally, a slope of the weight may be fixed independently of its range. Alternatively, if the weight has a wide range, the slope may be variable to achieve smoothness.

In the above-described embodiment, a histogram of the hue (H) is analyzed by searching this histogram in a positive direction and a negative direction with respect to an average as a starting point. Alternatively, the histogram may be searched in a direction from an edge toward the center, for example.

In the above-described embodiment, a face map is a mask image having an oval shape substantially corresponding to the shape of a face area. Alternatively, for the reason that the oval shape is a symmetrical shape, the face map may be a quarter of the oval shape and may be quadrupled equally to form the oval shape in preparation for use, for example. This achieves reduction in a storage capacity.

In the above-described embodiment, a skin color level and a saturated level are calculated. As a result of the calculations, an area of a high saturated level is extracted as a saturated area. If this saturated area has a ratio not exceeding a given ratio, a skin map is generated by using only the skin color level. Alternatively, an area may be determined as a saturated area on condition that this area has a saturated level at a given value. If this saturated area has a ratio not exceeding a given ratio, a skin map may be generated by using only the skin color level.

According to the above-described embodiment, a digital camera is shown as an example of the image capture apparatus 1 to which the present invention is applied. However, the image capture apparatus 1 is not particularly limited to a digital camera. For example, the present invention is applicable to common electronic devices having the function of the aesthetically-enhanced skin image generation processing. More specifically, for example, the present invention is applicable to notebook personal computers, printers, television receivers, video cameras, portable navigation devices, portable telephones, smartphones, handheld game consoles, etc.

The above-described processing sequence can be executed by hardware or by software. In other words, the functional configuration shown in FIG. 7 is merely an illustrative example, and the present invention is not particularly limited to this configuration. Specifically, as long as the image capture apparatus 1 has a function enabling the above-described processing sequence to be executed in its entirety, the types of functional blocks employed to realize this function are not particularly limited to the example shown in FIG. 7. In addition, a single functional block may be configured by a hardware unit, by a software unit, or by combination of the hardware and software units. The functional configuration according to the present embodiment is realized by a processor to execute arithmetic processing. The processor applicable to the present invention includes processors formed of various processing units such as a single processor, a multiprocessor, and a multi-core processor, and processors formed of combinations between these processing units and processing circuits such as an application specific integrated circuit (ASIC) and a field-programmable gate array, for example.

If the processing sequence is to be executed by software, a program configuring the software is installed from a network or a storage medium into a computer, for example. The computer may be a computer embedded in dedicated hardware. Alternatively, the computer may be a general-purpose personal computer, for example, capable of executing various functions by means of installation of various programs.

The storage medium containing such programs can not only be constituted by the removable medium 31 shown in FIG. 1 distributed separately from an apparatus body in order to supply the programs to a user, but can also be constituted by a storage medium or the like supplied to the user in a state of being incorporated in the apparatus body in advance. The removable medium 31 is for example formed of a magnetic disk (including a floppy disk), an optical disk, or a magneto-optical disk. The optical disk is for example formed of a compact disk read-only memory (CD-ROM), a digital versatile disk (DVD), or a Blu-ray (registered trademark) Disk (Blu-ray Disk). The magneto-optical disk is for example formed of a Mini-Disk (MD). The storage medium, which is supplied to the user in a state of being incorporated in the apparatus body in advance, is for example formed of the ROM 12 shown in FIG. 1 storing a program or a hard disk included in the storage unit 19 shown in FIG. 1.

It should be noted that, in the present specification, the steps describing the program stored in the storage medium include not only processes executed in a time-series manner according to the order of the steps, but also processes executed in parallel or individually and not always required to be executed in a time-series manner.

While some embodiments of the present invention have been described above, these embodiments are merely exemplifications, and are not to limit the technical scope of the present invention. Various other embodiments can be employed for the present invention, and various modifications such as omissions and replacements are applicable without departing from the substance of the present invention. Such embodiments and modifications are included in the scope of the invention and the summary described in the present specification, and are included in the invention recited in the claims as well as in the equivalent scope thereof.

What is claimed is:

1. A detection method comprising: skin color level acquisition processing of acquiring a skin color level indicating a skin color likelihood from an image;
a saturated level acquisition processing of acquiring (i) a saturated level indicating a degree of saturation of the image, and (ii) a saturated area in the image;
a determination processing of determining whether a ratio of the saturated area to the image is lower than a set ratio; and
skin color area detection processing of detecting (i) a skin color area in the image based on the skin color level on the condition that the ratio is determined to be lower than the set ratio, and (ii) a skin color area in the image based on the skin color level and the saturated level on the condition that the ratio is determined not to be lower than the set ratio.

2. The detection method according to claim 1, wherein in the skin color level acquisition processing, the skin color level is acquired based on information about a color component in HSV color space containing a hue component, and
in the saturated level acquisition processing, the saturated level is acquired based on information about a color component in HSV color space except the hue component.

3. The detection method according to claim 1, wherein in the skin color area detection processing, an area in which at least one of the acquired skin color level and the calculated saturated level is a given threshold or more is detected as a skin color area.

4. The detection method according to claim 1, wherein in the skin color area detection processing, processing of detecting a skin color area in a human face in the image is executed by further using information about a face area of a human prepared in advance as a basis.

5. The detection method according to claim 1, further comprising image processing of executing skin aesthetically-enhancement processing on the skin color area detected by the skin color area detection processing.

6. The detection method according to claim 1, wherein the determination processing of determining whether the ratio of the saturated area to a specified area of the image is lower than the set ratio.

7. The detection method according to claim 6, wherein the specified area is a face area of an object.

8. The detection method according to claim 1, further comprising a skin map generation processing of generating (i) a skin map based on the skin color level on the condition that the ratio has been determined as lower than the set ratio, and (ii) a skin map based on the skin color level and the saturated level on the condition that the ratio has been determined as not lower than the set ratio.

9. The detection method according to claim 1, wherein the skin area detection processing of detecting the skin area based on information which is a larger one of a value of a skin map and a value of a saturated map on the condition that the ratio is determined to be lower than the set ratio, wherein the value of the skin map is calculated based on the skin color level, and the value of the saturated map is calculated based on the saturated level.

10. A detection apparatus comprising a processor: wherein the processor is configured to;
   acquire a skin color level indicating a skin color likelihood from an image;
   acquire (i) a saturated level indicating a degree of saturation of the image, and (ii) a saturated area in the image;
   determine whether a ratio of the saturated area to the image is lower than a set ratio; and
   detect (i) a skin color area in the image based on the skin color level on the condition that the ratio is determined to be lower than the set ratio, and (ii) a skin color area in the image based on the skin color level and the saturated level on the condition that the ratio is determined not to be lower than the set ratio.

11. A non-transitory computer readable storage medium stored storing a program for controlling a computer of a detection electronic device which includes:
   skin color level acquisition processing of acquiring a skin color level indicating a skin color likelihood from an image;
   a saturated level acquisition processing of acquiring (i) a saturated level indicating a degree of saturation of the image, and (ii) a saturated area in the image;
   a determination processing of determining whether a ratio of the saturated area to the image is lower than a set ratio; and
   a skin color area detection processing of detecting (i) a skin color area in the image based on the skin color level on the condition that the ratio is determined to be lower than the set ratio, and (ii) a skin color area in the image based on the skin color level and the saturated level on the condition that the ratio is determined not to be lower than the set ratio.

* * * * *